(12) United States Patent
Schwyzer et al.

(10) Patent No.: US 12,547,716 B2
(45) Date of Patent: Feb. 10, 2026

(54) MACHINE LEARNING-BASED MALWARE DETECTION FOR CODE REFLECTION

(71) Applicant: CrowdStrike, Inc., Sunnyvale, CA (US)

(72) Inventors: Felix Schwyzer, Berlin (DE); Marian Radu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 211 days.

(21) Appl. No.: 18/158,744

(22) Filed: Jan. 24, 2023

(65) Prior Publication Data

US 2024/0248990 A1 Jul. 25, 2024

(51) Int. Cl.
*G06F 21/00* (2013.01)
*G06F 21/56* (2013.01)

(52) U.S. Cl.
CPC ...... *G06F 21/566* (2013.01); *G06F 2221/033* (2013.01)

(58) Field of Classification Search
CPC .......... G06F 21/566; G06F 2221/033
See application file for complete search history.

(56) References Cited

U.S. PATENT DOCUMENTS

| | | | | |
|---|---|---|---|---|
| 6,530,077 | B1* | 3/2003 | Marsh | G06F 9/445 711/147 |
| 11,562,071 | B2* | 1/2023 | Jung | G06F 11/3037 |
| 11,853,853 | B1* | 12/2023 | Beauchesne | G06N 5/01 |
| 2017/0024135 | A1* | 1/2017 | Christodorescu | G06F 21/552 |
| 2018/0314983 | A1* | 11/2018 | Sai | H04L 63/145 |
| 2020/0005082 | A1* | 1/2020 | Cazan | G06N 3/08 |
| 2023/0319108 | A1* | 10/2023 | Gechman | G06F 40/284 726/22 |
| 2023/0325501 | A1* | 10/2023 | Chhetri | G06F 21/53 726/24 |
| 2024/0089270 | A1* | 3/2024 | Razinskas | H04L 63/1416 |
| 2024/0205256 | A1* | 6/2024 | Tormasov | H04L 63/1425 |

OTHER PUBLICATIONS

Namani et al., "Symbolic execution based feature extraction for detection of malware", 2020 5th International Conference on Computing, Communication and Security (ICCCS) (Year: 2020).*

Sanjay, et al. "An Approach to Detect Fileless Malware and Defend its Evasive mechanisms," 2018 3rd International Conference on Computational Systems and Information Technology for Sustainable Solutions (CSITSS), Bengaluru, India, pp. 234-239 (Year: 2018).*

* cited by examiner

*Primary Examiner* — Morshed Mehedi
(74) *Attorney, Agent, or Firm* — Womble Bond Dickinson (US) LLP

(57) ABSTRACT

A process subset of an executing process is obtained from a memory of a computing device. The process subset includes less than all of an in-memory executable program generated by the executing process. A feature vector is extracted from the process subset based on data within the process subset. A malware classification is generated based on the process subset. A remediation operation is initiated on the executing process based on the malware classification.

17 Claims, 8 Drawing Sheets

MACHINE LEARNING-BASED MALWARE DETECTION FOR CODE REFLECTION

TECHNICAL FIELD

Aspects of the present disclosure relate to detecting malicious executables, and more particularly, to detecting malicious executables through analysis of process memory.

BACKGROUND

Malware is a term that refers to malicious software. Malware includes software that is designed with malicious intent to cause intentional harm and/or bypass security measures. Malware is used, for example, by cyber attackers to disrupt computer operations, to access and to steal sensitive information stored on the computer or provided to the computer by a user, or to perform other actions that are harmful to the computer and/or to the user of the computer. Malware may be formatted as executable files (e.g., COM or EXE files), dynamic link libraries (DLLs), scripts, steganographic encodings within media files such as images, and/or other types of computer programs, or combinations thereof. Malware authors or distributors frequently disguise or obfuscate malware in attempts to evade detection by malware-detection or -removal tools.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
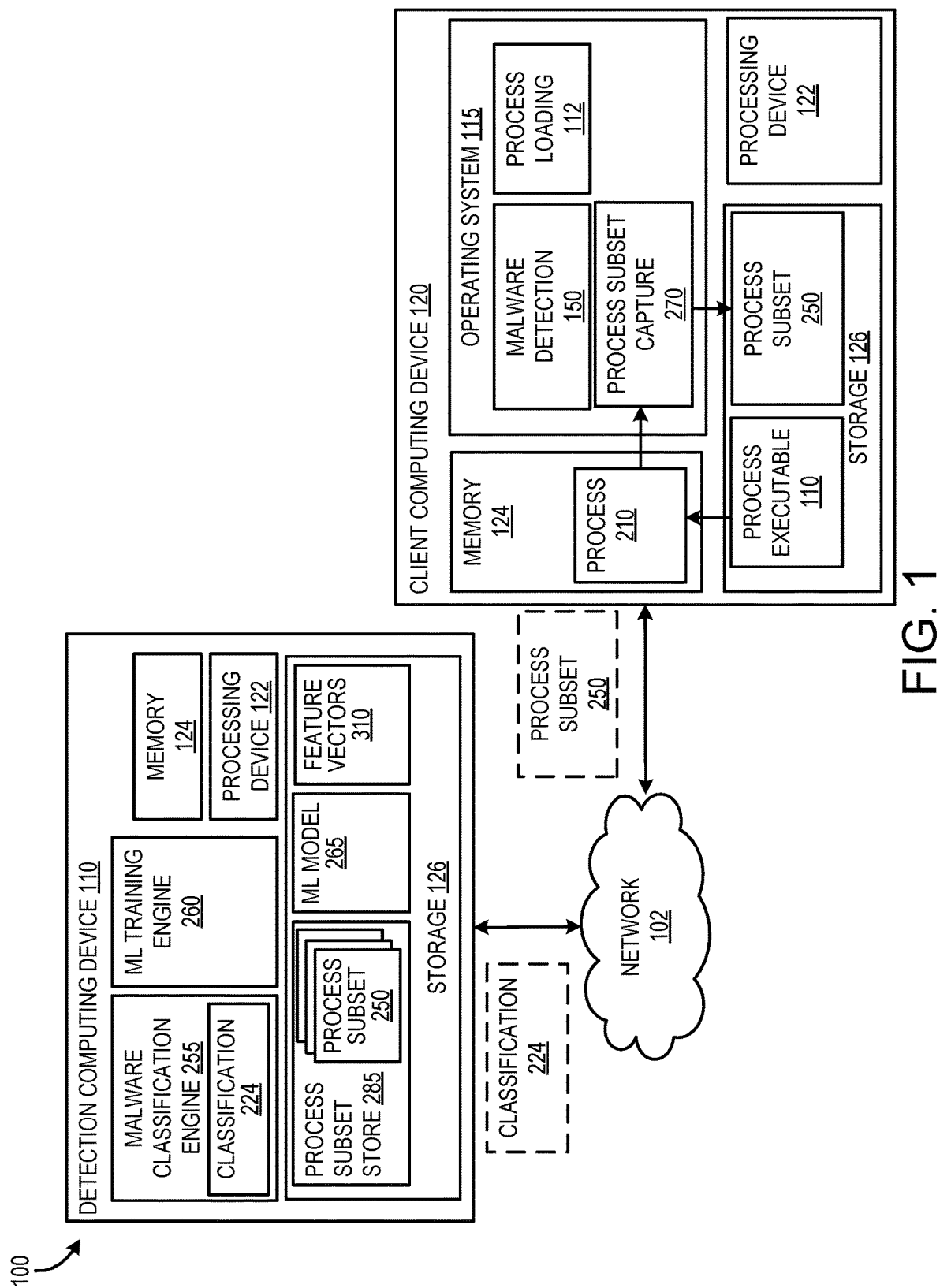
FIG. 1 is a block diagram that illustrates an example system, according to some embodiments of the present disclosure.

Modern computer systems are subject to a large number of potential malware attacks. Examples of malware include computer viruses, worms, Trojan horses, ransomware, rootkits, keyloggers, spyware, adware, rogue security software, potentially unwanted programs (PUPs), potentially unwanted applications (PUAs), and other malicious programs. To protect from such malware, users may install scanning programs which attempt to detect the presence of malware. These scanning programs may review programs and/or executables that exist on the computer's storage medium (e.g., a hard disk drive (HDD)) prior to execution of the file. However, authors and distributors of malware have taken countermeasures to avoid these scanning programs. In some cases, the malware is obfuscated to conceal the contents of the file. Obfuscation may include varying the contents of the file to misdirect, confuse, or otherwise conceal the true purpose and/or function of the code. For example, obfuscation may include inserting inoperable code within the executable instructions, compressing/encrypting the operating instructions, rearranging the code instructions, and/or other techniques. These techniques can make it difficult to identify malware in at-rest files.

In some cases, malware may be implemented using code reflection. Code reflection includes computer instructions that may be configured to self-modify the computer instructions in memory during program execution (e.g., at runtime). Within the context of malware, reflective coding can be used to modify the instruction set of a process in memory, and execute the modified instruction set. This can, in some cases, be done without making the full instruction set visible in an at-rest executable file (for example, the instructions may be encrypted, dynamically generated from dissimilar code, or otherwise obfuscated).

One example of code reflection includes .NET assemblies. The .NET framework is an open-source platform for building desktop, web, and mobile applications that can run natively on many operating systems. A .NET assembly is a unit of deployment within the .NET framework. In a WINDOWS™ environment, for example, a .NET assembly may be generated and loaded into the context of a process using reflective code loading. In some embodiments, the .NET assembly loaded into memory may have a particular file format, such as the portable executable/common object file format (PE/COFF). Once loaded into memory, the .NET assembly may be executed. Other mechanisms that can perform similar types of reflective loading include reflective dynamic link library (DLL) injection, in which a DLL library is reflectively loaded into a process memory space and executed.

Executing dynamically-generated applications in memory may be preferable to malware authors, as the technique may leave no forensic artifacts on disk which may be scanned by malware detection executables that perform only storage scanning. Scanning memory may be difficult, as the memory space may be large, and delaying applications until a full memory space is scanned may unacceptably impact process performance. Moreover, in some cases, performing an in-memory scan locally may be subject to attack, since the malware program that accomplished the reflective loading may also be able to impede the local scan. In addition, local scans may be administratively difficult to maintain, as they may require frequent updates to stay current with ever-changing malware attacks.

The present disclosure addresses the above-noted and other deficiencies by providing a feature extractor and machine learning operation that can identify malware from only a subset of a running process. In some cases, when an executable program containing malware is reflectively loaded into the memory space of a process, obfuscation that may have been present in the stored executable may be removed and/or rearranged as a consequence of generating the formatted malware for execution. By analyzing the subset of a running process, including a structure of the dynamically-loaded instructions, the portion of the code that has been loaded may be compared to known malware to detect a potential attack.

In some embodiments, described herein, a subset of an executing process taken from the memory of a first computing device may be captured and transmitted to a second computing device. The memory capture may be analyzed (e.g., by executable instructions implementing a feature extractor) to detect whether certain features are present. For example, a data file associated with the subset of the process memory may be scanned for byte n-grams, particular strings, a structure of the associated instructions, and/or entropy. The presence and/or absence of these particular features within the subset of the process memory may be provided to a machine learning model to create a tool capable of classifying such memory captures. In this way, memory images can be scanned, and malware detected, despite the malware not being detectable on a storage device at rest.

The embodiments described herein provide improvements over some scanning mechanisms which rely on the detection of particular signatures in stored files. In sharp contrast, the feature extractor described herein may be capable of determining features (e.g., characteristics of data within a memory capture of a subset of an executing process) that are indicative of an executing process that contains malware. These features may be identified, in some cases, regardless of attempts by an author of the malware to change its data signature. In this way, embodiments according to the present disclosure may provide an improved capability of detecting malware, and may increase the security of a computer system.

In addition, the use of only a subset of a process in some embodiments may allow for smaller amounts of data to be captured. For example, by capturing only a subset of the memory space of a process, the capturing of the full memory space of the process may be avoided and the amount of data captured may be reduced. The use of smaller data packets may allow for the subset of the process to be transmitted to the remote second computing device, analyzed, and returned within a suitable timeframe (e.g., sub-second) to not appreciably impact the performance of the executing process. In some embodiments, by maintaining the analysis on a separate system, the analysis may be less vulnerable to malware attacks and may be easer to update and maintain. Embodiments of the present disclosure may allow for detection of malware, especially in .NET assemblies, through analysis of a smaller subset of data, reducing an amount of resources needed to detect malware or enabling detection when only a portion of the data is available.

FIG. 1 is a block diagram that illustrates an example system 100, according to some embodiments of the present disclosure. FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a first computing device 110 (also referred to herein as a detection computing device 110) and a second computing device 120 (also referred to herein as a client computing device 120). The detection computing device 110 and the client computing device 120 may each include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

In some embodiments, memory 124 may be volatile memory that loses contents when the power to the computing device is removed or non-volatile memory that retains its contents when power is removed. In some embodiments, memory 124 may be non-uniform access (NUMA), such that memory access time depends on the memory location relative to processing device 122.

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like. It should be noted that although, for simplicity, a single processing device 122 is depicted in the client computing device 120 and the detection computing device 110 depicted in FIG. 1, other embodiments of the client computing device 120 and/or the detection computing device 110 may include multiple processing devices, storage devices, or other devices.

A storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The detection computing device 110 and/or the client computing device 120 may comprise any suitable type of computing device or machine that has a programmable processor including, for example, server computers, desktop computers, laptop computers, tablet computers, smartphones, set-top boxes, etc. In some examples, the detection computing device 110 may comprise a single machine or may include multiple interconnected machines (e.g., multiple servers configured in a cluster). The detection computing device 110 and/or the client computing device 120 may be implemented by a common entity/organization or may be implemented by different entities/organizations.

The detection computing device 110 and/or the client computing device 120 may be coupled to each other (e.g., may be operatively coupled, communicatively coupled, may communicate data/messages with each other) via network 102. Network 102 may be a public network (e.g., the internet), a private network (e.g., a local area network (LAN) or wide area network (WAN)), or a combination thereof. In one embodiment, network 102 may include a wired or a wireless infrastructure, which may be provided by one or more wireless communications systems, such as a WIFI™ hotspot connected with the network 102 and/or a wireless carrier system that can be implemented using various data processing equipment, communication towers (e.g., cell towers), etc. The network 102 may carry communications (e.g., data, message, packets, frames, etc.) between the detection computing device 110 and/or the client computing device 120.

The client computing device 120 may execute an operating system 115. The operating system 115 of the client computing device 120 may manage the execution of other components (e.g., software, applications, etc.) and/or may manage access to the hardware (e.g., processors, memory, storage devices etc.) of the client computing device 120. Operating system 115 may be software to provide an interface between the computing hardware (e.g., processing device 122 and/or storage device 126) and applications running on the operating system 115.

Operating system 115 may include an OS kernel and a user space supporting the execution of one or more processes 210. Though only a single process 210 is illustrated in FIG. 1, it will be understood that a plurality of processes 210 may be present. Operating system 115 may include several operating system functionalities, including but not limited to process management, hardware interfaces, access control and the like. Examples of operating systems 115 include WINDOWS™, LINUX™, ANDROID™, IOS™, and MACOS™. Though not expressly illustrated in FIG. 1, the detection computing device 110 may also include an operating system, which may, in some embodiments, be different than that of the operating system 115 of the client computing device 120.

As illustrated in FIG. 1, the client computing device 120 may execute (e.g., using processing device 122) a process 210. Process 210 may be a desktop application, a network application, a database application, or any other application that may be executed by the operating system 115. To be executed, the process 210 may be loaded from a process executable 110 (e.g., in storage device 126) into memory 124. The process executable 110 may be a file, for example, on the storage device 126 that contains executable instructions. In some embodiments, the loading of the process 210 may be performed by a process loading component 112 of the operating system 115. The operating system 115 may allocate execution resources (e.g., processing device 122 and/or memory 124) to the process 210 (e.g., by a multitasking scheduler). The processing device 122 may execute the executable instructions of the process 210.

The image of the process 210 in memory (e.g., a data structure and/or physical layout) may differ from a data structure and/or physical layout of the process executable 110. As part of the process loading (e.g., as performed by the process loading component 112), the process executable 110 may be analyzed and portions of the process executable 110 may be loaded into memory 124. For example, the executable instructions of the process executable 110 may be extracted and transferred to memory 124. The process loading component 112 may also establish portions of the memory 124 for use by the process 210. These portions may include data used by and/or generated by the process 210 during execution.

Figure 2:
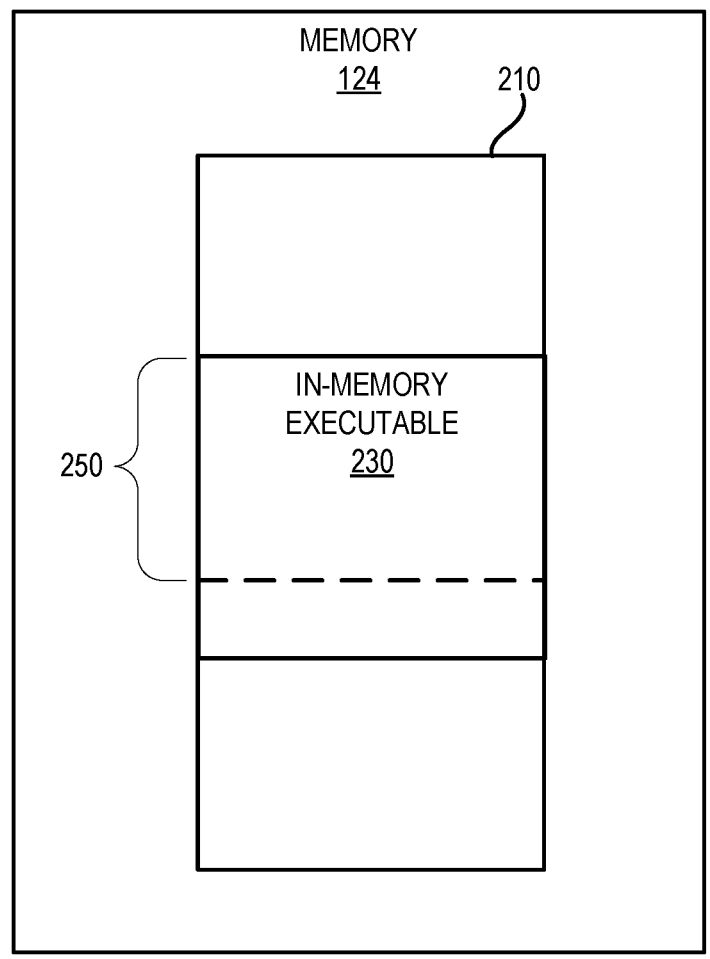
FIG. 2 is a block diagram illustrating an example of how a process may be organized in memory, according to some embodiments of the present disclosure.

FIG. 2 is a block diagram illustrating an example of how a process 210 may be organized in memory 124, according to some embodiments of the present disclosure. FIG. 2 is a block diagram that illustrates an example process 210 executing within a computing device, in accordance with some embodiments of the present disclosure. FIG. is a schematic example only, and is not intended to limit the embodiments of the present disclosure.

Referring to FIGS. 1 and 2, portions of the memory 124 occupied by the process 210 may include instructions and/or data. The instructions may include computer instructions for execution (e.g., by processing device 122). The data may include data values operated on by the instructions. In some embodiments, the process 210 may include an in-memory executable 230. The in-memory executable 230 may be a segment of executable code loaded into the process 210.

In some embodiments, the in-memory executable 230 may be a .NET assembly. As previously described, a .NET assembly may be generated and loaded into the context of the process 210 using reflective code loading. The embodiments of the present disclosure are not limited to a .NET assembly. In some embodiments, the in-memory executable 230 may be a DLL or other type of dynamically generated instructions.

As will be further described herein, a subset 250 of the process 210 may include a portion of, but not necessarily all of, the in-memory executable 230. In order to generate the ML model 265, the process subset store 285 may be gathered. The process subset 250 may include an image (e.g., the data contents) of the process 210 in memory 124. The image of the process 210 may be a set of digital data representing the contents of the memory 124 that are associated with the process 210. In some embodiments, the process subset 250 may include data regarding the addresses, which may be virtual addresses assigned by the operating system 115, of the process 210. The process subset 250 may include what is commonly referred to as a memory dump of a portion of the process 210 that is less than all of the process 210. For example, the process subset 250 may include the contents of the memory space (e.g., within memory 124) of the process 210, including formatted sections of the in-memory executable 230 having metadata.

For example, if the in-memory executable 230 is a NET assembly, the process subset 250 may include portions of the various sections of the .NET assembly. For example, the process subset 250 may include one or more portions of the PE/COFF structure of the .NET assembly, including one or more of the sections and/or headers of the PE/COFF structure and the section contents. For example, the process subset 250, including portions of the in-memory executable 230, may include a DOS header, a COFF header, data directories, section headers (for sections of the in-memory executable 230) and/or other optional headers.

The subset 250 may exclude a portion of the in-memory executable 230 and may thus be less than the full size of the in-memory executable 230 and, in some embodiments, significantly less than the full size of the in-memory executable 230 and/or the process 210 in memory. In some embodiments, the subset 250 may be less than 64 kilobytes (kB) of data. In some embodiments, the process subset 250 may be less than 100 kB of data. For instance, the subset 250 may have a fixed size, or a maximum size, regardless of the size of the in-memory executable 230 such that the subset 250 is a truncated version of the in-memory executable 230 to fit the fixed size or maximum size. Though the process subset 250 may be less than the full size of the in-memory executable 230, embodiments of the present disclosure are not limited to such a configuration. In some embodiments, the process subset 250 may include the full size of the in-memory executable 230 (e.g., the process subset 250 may include all of the portions of the in-memory executable 230).

In some embodiments, the in-memory executable 230 may be generated directly to the memory 124. For example, the in-memory executable 230 may be generated by instructions of the process 210 and may bypass storage of the client computing device 120 (e.g., storage device 126). As a result, it may be difficult for some malware detection mechanisms that focus on the at-rest files of the storage device 126 to detect the in-memory executable 230.

Referring to FIGS. 1 and 2, a malware detection engine 150 may execute on the client computing device 120. The malware detection engine 150 may be configured to detect a presence of malicious software (referred to herein as "malware") on the client computing device 120 (or associated with the client computing device 120). Malware includes software and/or executing instructions that are designed to disrupt, damage, or gain unauthorized access to the client computing device 120. Malware may be formatted as executable files (e.g., COM or EXE files), dynamic link libraries (DLLs), scripts, steganographic encodings within media files such as images, and/or other types of computer programs, or combinations thereof.

In some embodiments, the malware detection engine 150 may be configured to scan a process executable 110 to detect malware. The scan may involve an analysis of the contents of the process executable 110 to detect traces of malware. For example, the malware detection engine 150 may analyze the contents of the process executable 110 to identify known signatures of code or particular types of viruses that are known to the malware detection engine 150. A process executable 110 that is identified to contain malware may be isolated within the client computing device 120 and, for example, be prevented from executing.

However, developers of malware are aware of some of the techniques used by malware scanning programs, such as the malware detection engine 150. In response, developers of malware have obfuscated the contents of their process executables 110. For example, obfuscation may include inserting inoperable code within the executable instructions, compressing/encrypting the operating instructions, rearranging the code instructions, and/or other techniques. Obfuscated code may be more difficult to process with the malware detection engine 150 because a signature of the malware may be removed or otherwise obscured by the obfuscation.

In some embodiments, obfuscated code within the process executable 110 may be configured to insert malware as an in-memory executable 230 (see FIG. 2) into its own process 210 and/or another process 210 on the client computing device 120. Once inserted into the process 210, the in-memory executable 230 may be present in a non-obfuscated format. In some embodiments of the present disclosure, a process subset 250 (see FIG. 2) of the in-memory executable 230 may be captured and analyzed to detect the in-memory executable 230.

To take advantage of this malware vulnerability, some embodiments of the present disclosure may be configured to capture a process subset 250 including a portion of the in-memory executable 230 of the process 210, and provide the process subset 250 to the detection computing device 110, as will be described further herein.

The process subset 250 may be captured and/or obtained by process subset capture engine 270. The process subset capture engine 270 may be configured to generate the process subset 250 by dynamically copying the contents of memory 124 of the client computing device 120. In some embodiments, the process subset capture engine 270 may be configured to capture the process subset 250 associated with a single process 210. In some embodiments, the process subset capture engine 270 may be configured to capture the process subset 250 associated with a plurality of processes 210.

In some embodiments, the process subset capture engine 270 may automatically detect the creation of the in-memory executable 230 and automatically capture the process subset 250. For example, in some embodiments, the process subset capture engine 270 may be configured to detect the loading of the in-memory executable 230 and automatically capture an initial part of the in-memory executable 230, including the beginning and/or start of the in-memory executable 230 and portions of the initial headers and metadata of the in-memory executable 230. In some embodiments, the start of the in-memory executable 230 may be at a different location in memory 124 than a start of the process 210 containing the in-memory executable 230. In some embodiments, the process subset capture engine 270 may execute within the host operating system 115 of the client computing device 120. As part of the operating system 115 (e.g., as part of the operating system kernel), the process subset capture engine 270 may have additional (e.g., administrative level) permissions including access to the full range of memory 124.

The process subset capture engine 270 may be configured to perform a data copy of a portion of the process 210 executing within the memory 124 to generate process subset 250. In some embodiments, the data copy may be made without the permission, or even the visibility, of the process 210, since the operating system 115 may control access to the memory 124. For example, the process subset capture engine 270 may be a part of the Antimalware Scan Interface (AMSI) provided as part of the WINDOWS operating system 115.

The process subset capture engine 270 may provide the process subset 250 to the malware detection engine 150. The malware detection engine 150 may be configured to determine a malware classification for the process subset 250 and, in some embodiments, perform a remediation responsive thereto. For example, the malware detection engine 150 may be configured to determine if the process subset 250 is, or is associated with, malware. In response to determining that the process subset 250 is, or is associated with, malware, the malware detection engine may terminate the process 210, terminate and/or unload the in-memory executable 230, deny the in-memory executable 230 permission to execute from memory 124, deny the process 230 and/or the in-memory executable 230 access to resources of the client computing device 120, and/or generate an alert regarding the potential for malware.

In some embodiments, to generate a classification for the process subset 250, the malware detection engine 150 may transmit the process subset 250 to the detection computing device 110. For example, the process subset 250 may be transported over network 102 to the detection computing device 110.

In some embodiments, a malware classification engine 255 of the detection computing device 110 may be configured to receive the process subset 250 and extract one or more feature vectors 310 from the process subset 250. As will be described further herein, feature vectors 310 of the process subset 250 may include one more characteristics of the process subset 250 and/or data of the process subset 250. The feature vectors 310 may be provided by the malware classification engine 255 to a machine learning (ML) model 265 that has been trained to generate a classification 224 as to whether a given process subset 250 is, or is associated with, malware, based on the feature vectors 310. In some embodiments, the classification 224 may be a probability that the process subset 210 is, or is associated with, malware.

Once generated, the classification 224 may be provided to the client computing device 120 (e.g., over network 102). The classification 224 may be utilized by the malware detection engine 150 in determining if a given process 210 (or an in-memory executable 230 of the process 210) is, or is associated with, malware. For example, based on the classification 224 received from the detection computing device 110 indicating a presence of malware, the malware detection engine 150 may perform remediation with regard to the process 210.

The detection computing device 110 may include an ML training engine 260 to generate the ML model 265 based on a process subset store 285 taken from executing processes 210 by the process subset capture engine 270. The process subset store 285 may include a plurality of process subsets 250 captured from a plurality of processes 210. In some embodiments, respective process subsets 250 of process subset store 285 may have a known classification 224 (e.g., known malware or not) that may be used as part of the training of the ML model 265. In some embodiments, different process subsets 250 of the process subset store 285 may be generated from different computing devices (e.g., computing devices other than client computing device 120).

Once trained, the ML model 265 may then be used by the malware detection engine 250 to generate a malware classification 224 regarding the provided process subset 250 associated with the process 210 instead of and/or in addition to scanning for signatures in the process executable 110. Embodiments of the present disclosure will be discussed in further detail with respect to the figures described herein.

In FIG. 1, though malware detection engine 150, malware classification engine 255, ML training engine 260, and process subset capture engine 270 are illustrated as separate components, this is only for the sake of simplicity of illustration. In some embodiments, one or more of the malware detection engine 150, malware classification engine 255, ML training engine 260, and process subset capture engine 270 may be combined with other components. For example, in some embodiments, the detection computing device 110 and the client computing device 120 may be a same computing device. Namely, a client computing device 120 may be configured to generate and/or receive an ML model 265, and to perform malware classification 255 based on the ML model 265.

Similarly, though the malware detection engine 150, the malware classification engine 255, the ML training engine 260, and the process subset capture engine 270 are illustrated as separate from other components of the detection computing device 110 (e.g., from memory 124), this is only for ease of discussion. In some embodiments, one or more of the malware detection engine 150, malware classification engine 255, ML training engine 260, and process subset capture engine 270 may be resident in memory 124 (e.g., as executable code instructions).

In some embodiments, one or more of the malware detection engine 150, the malware classification engine 255, the ML training engine 260, and/or the process subset capture engine 270 may exist and/or execute on different computing devices 110, 120. For example, a first computing device 110, 120 may be used to capture running processes (e.g., utilizing process subset capture engine 270) to generate process subset 250, a second computing device 110, 120 may be used to perform ML training (e.g., utilizing ML training engine 260) to generate the ML model 265, and a third computing device 110, 120 may be used to classify malware (e.g., utilizing malware classification engine 255) based on the ML model 265.

Referring to FIG. 1, once a plurality of process subsets 250 of the process subset store 285 are captured, the process subset store 285 may be used to generate the ML model 265. For example, ML training engine 260 may analyze the process subset store 285 to train the ML model 265, such as by using machine learning techniques. In some embodiments, characteristics of the process subsets 250 of the process subset store 285 may be extracted to use as input by the ML training engine 260. For example, the ML training engine 260 may form feature vectors 310 from each of process subsets 250 of the process subset store 285, which may be used as part of one or more machine learning techniques.

Figure 3:
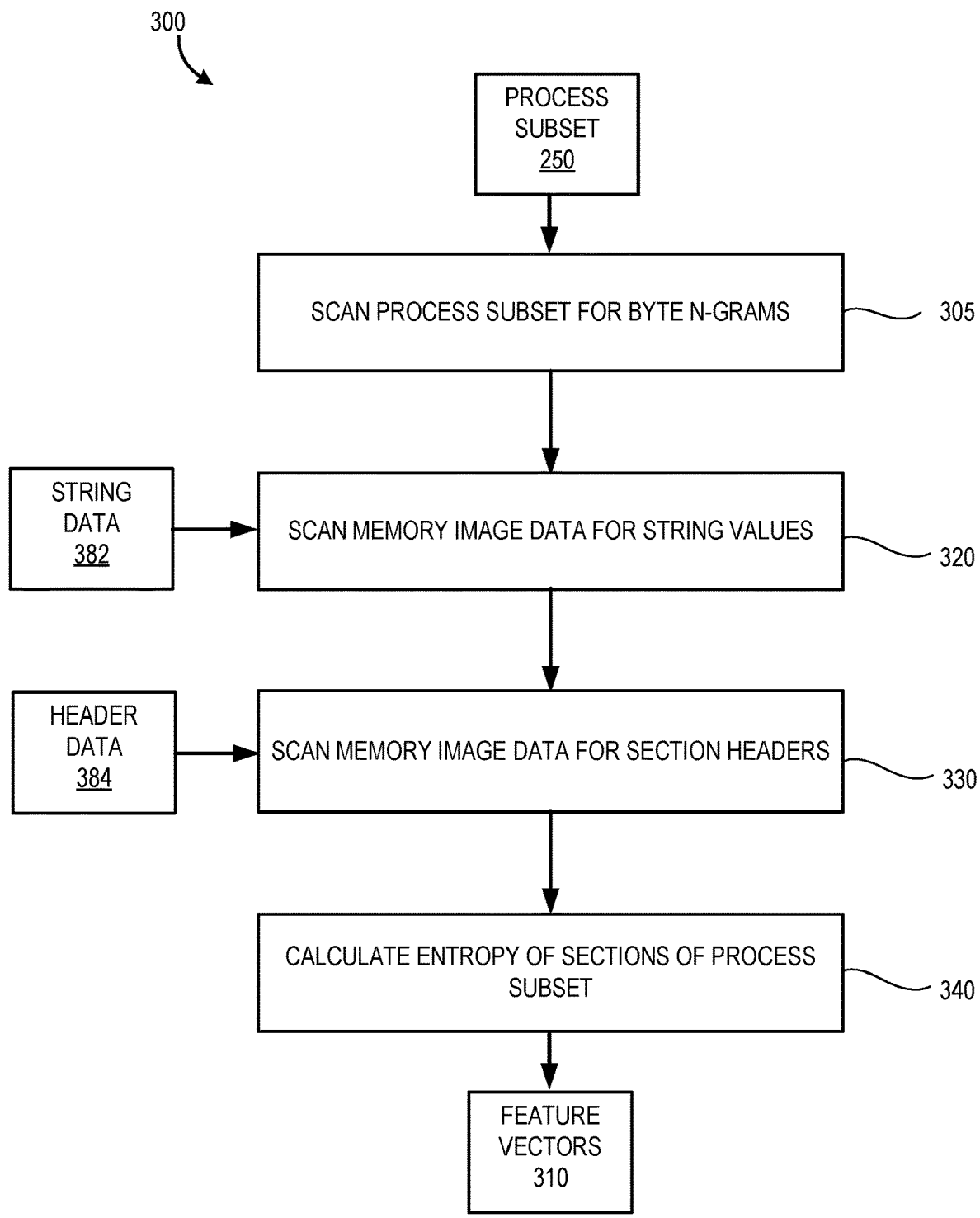
FIG. 3 is a flow diagram of a method for generating one or more feature vectors from a process subset, according to some embodiments of the present disclosure.

FIG. 3 is a flow diagram of a method 300 for generating one or more feature vectors 310 from a process subset 250, according to some embodiments of the present disclosure. A description of elements of FIG. 3 that have been previously described will be omitted for brevity. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., detection computing device 110).

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Referring simultaneously to FIGS. 1 and 2 as well, the method 300 begins at block 305, in which process subset data 250, provided as input to the method 300, may be scanned for byte n-grams. A byte n-gram is a contiguous sequence of n bytes (where n is an integer) within the process subset data 250. The byte n-grams may be indicative, for example, of a presence of malicious code within the in-memory executable 230. In some embodiments, the byte n-grams may be byte 4-grams.

As part of the operations of block 305, the process subset 250 may be scanned (e.g., byte by byte) for each of the byte n-grams within the process subset 250. In some embodiments, the byte n-grams within the process subset 250 may be processed by n-gram embedding techniques to generate a portion of the feature vectors 310. N-gram embedding is described, for example, in U.S. Patent Application Publication No. 2020/0005082 to Cazan, et. al. For example, n-gram embedding may include a machine learning model (e.g., a neural network model) that maps each of the byte n-grams as a vector within a plurality of axes within an embedding space. After each of the byte n-grams within the process subset 250 are processed by the embedding machine learning model, data regarding the plurality of axes may be generated as part of the feature vectors 310. For example, for each of the axes of the embedding space, a minimum value, a maximum value, an average value, and a standard deviation may be generated based on the byte n-grams processed by the embedding model. For example, for a model having N axes (e.g., 128 axes), a N×4 feature vectors 310 may be generated based on the byte n-grams within the process subset 250.

At block 320, the process subset 250 may be scanned for string values that may be indicative of malicious operations within the in-memory executable 230. For example, in some embodiments, the process subset 250 may be scanned for the presence of particular .NET strings. The string values may be a series of one or more data values, in some cases text characters, stored contiguously in memory. In some embodiments, a plurality of different strings that have been determined to be indicative of the types of operations and/or data associated with malware may be stored as string data 382. The strings included in the string data 382 may be indicative, for example, of a presence of malicious code within the in-memory executable 230. For example, the string data 382 may include strings that are indicative of certain types of programmatic functions or other known data signatures.

As part of the operations of block 320, the process subset 250 may be scanned (e.g., byte by byte) for each of the strings within the string data 382. In some embodiments, a count of a number of a number of times a respective string occurs in the process subset 250 may be determined, for each string in the string data 382. These counts may be included as one or more of the feature vectors 310.

At block 330, header data 384 of the process subset 250 may be scanned for section headers that may be indicative of malicious operations within the in-memory executable 230. As previously described, the in-memory executable 230 may be arranged in a particular file format, such as the PFJCOFF format. The PE format is a file format for executables, object code, DLLs and others used in 32-bit and 64-bit versions of WINDOWS operating systems. The PE format is a data structure that encapsulates the information necessary for the Windows OS loader (e.g., process loading engine 112 of FIG. 1) to manage the executable code contained in the executable. In some embodiments, the in-memory executable 230 may be stored in the process 210 in the PE format. As such, it may contain information according to the PE format. The PE format may include a number of headers and sections that tell the dynamic linker how to map the file into memory. The in-memory executable 239 may include a number of sections, such as .text or .data, each of which may include a section header.

In some embodiments, PE header and PE section headers may be extracted from the process subset 250. For example, headers that may be extracted and/or analyzed include a DOS header, a COFF header, data directories, and/or other optional headers. In addition, various headers from the sections of the process subset 250 may be included. The various headers, and the contents thereof may be indicative, for example, of a presence of malicious code within the in-memory executable 230. For example, the header data 384 may include particular headers and/or header contents, including metadata related to the header, that are indicative of certain types of programmatic functions or other known data signatures.

As part of the operations of block 330, the process subset 250 may be scanned to extract information related to the section headers and PE headers of the process subset 250, if present, that are within the header data 384. In some embodiments, a count of a number of a number of times a particular header, or a particular header metadata, occurs in the process subset 250 may be determined, for each element of header data in the header data 384. These counts may be included as one or more of the feature vectors 310. In some embodiments, the PE header and second header may be added to the feature vectors 310.

At block 340, an entropy calculation may be performed on one or more portions of the process subset 250. The entropy level may measure randomness of subsequent bytes relative to preceding bytes in the process subset 250. For example, a text document often exhibits a low level of entropy, while an encrypted or compressed version of the same text document may exhibit an increased level of entropy.

One measure of entropy is known as Shannon Entropy, and is generally defined as:

$$H = -\sum_{1}^{n} P(i) \log_2 P(i)$$

where H is the entropy level (measured in bits), n is the number of bytes in the sample and P(i) is the probability of byte i appearing in the stream of bytes. The entropy value H is a measure of predictability of a given byte within the process subset 250. The use of an entropy level in embodiments of the present disclosure include not only Shannon Entropy, but also other methods of calculating randomness of the process subset 250 understood by those of ordinary skill in the art.

In some embodiments, an entropy level may be calculated for particular sub-quantities of the process subset 250. For example, in some embodiments, an entropy may be calculated for each section (e.g., each PE section) within the process subset 250 or for fixed chunks of data of the process subset 250 (e.g., each 128 bytes, each 256 bytes, etc.). In some embodiments, the calculated entropy for each of the sub-quantities (e.g., each section or amount of data) of the process subset 250 may be included as part of the feature vectors 310. In some embodiments, a calculated entropy within particular ranges may indicate a non-randomness indicative of instruction codes or other data consistent with malicious executable code.

An output of the method 300 may include the feature vector(s) 310 representing a result of the various operations performed as part of the analysis of the process subset 250. The feature vectors 310 may be used to train the ML model 265 discussed herein with respect to FIG. 1 and/or to determine a classification 224 once an ML model 265 has been created.

Figure 4A:
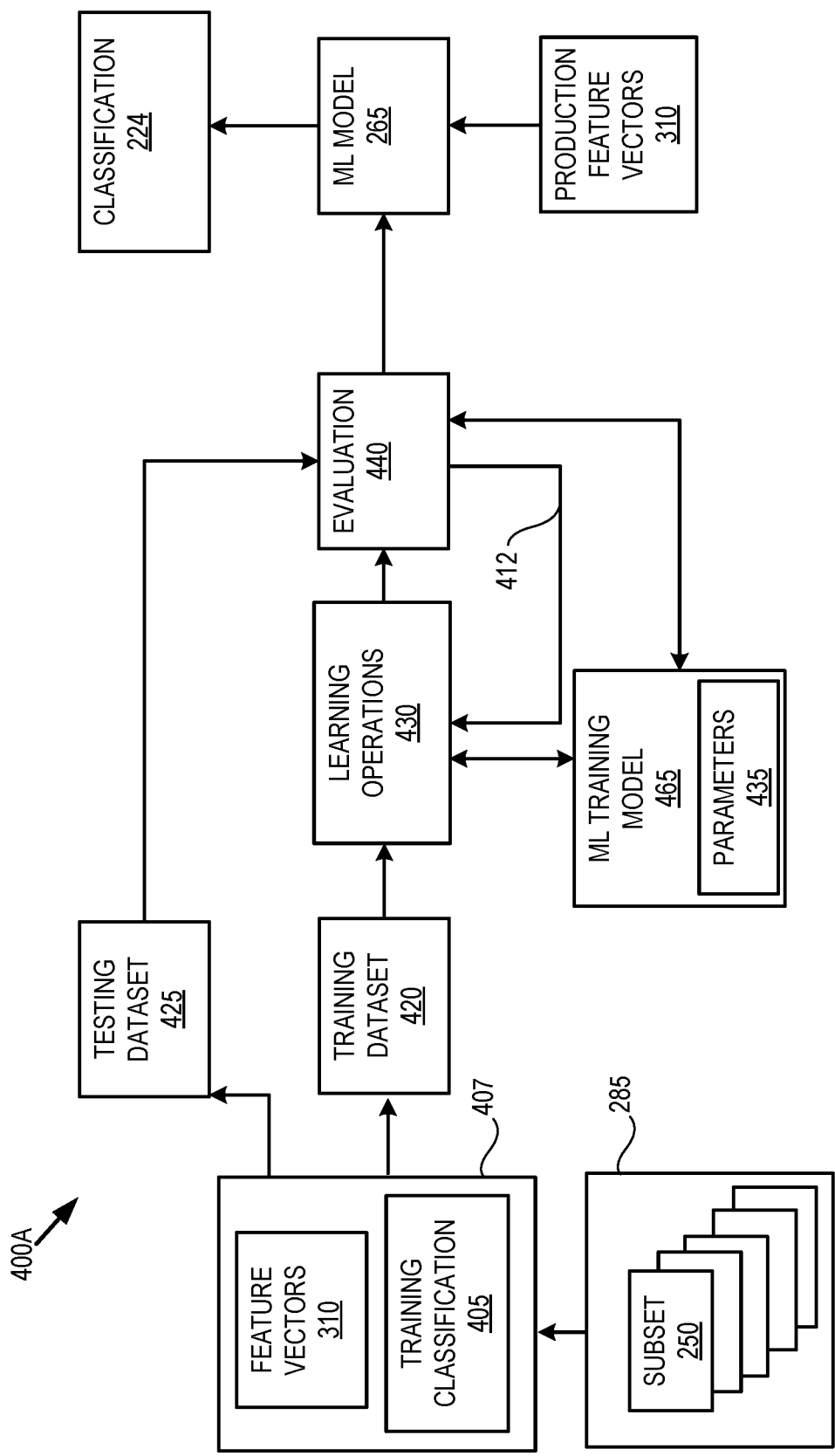
FIG. 4A is s block diagram illustrating an example training system for performing a machine learning operation based on feature vectors from process subset data, according to some embodiments of the present disclosure.
Figure 4B:
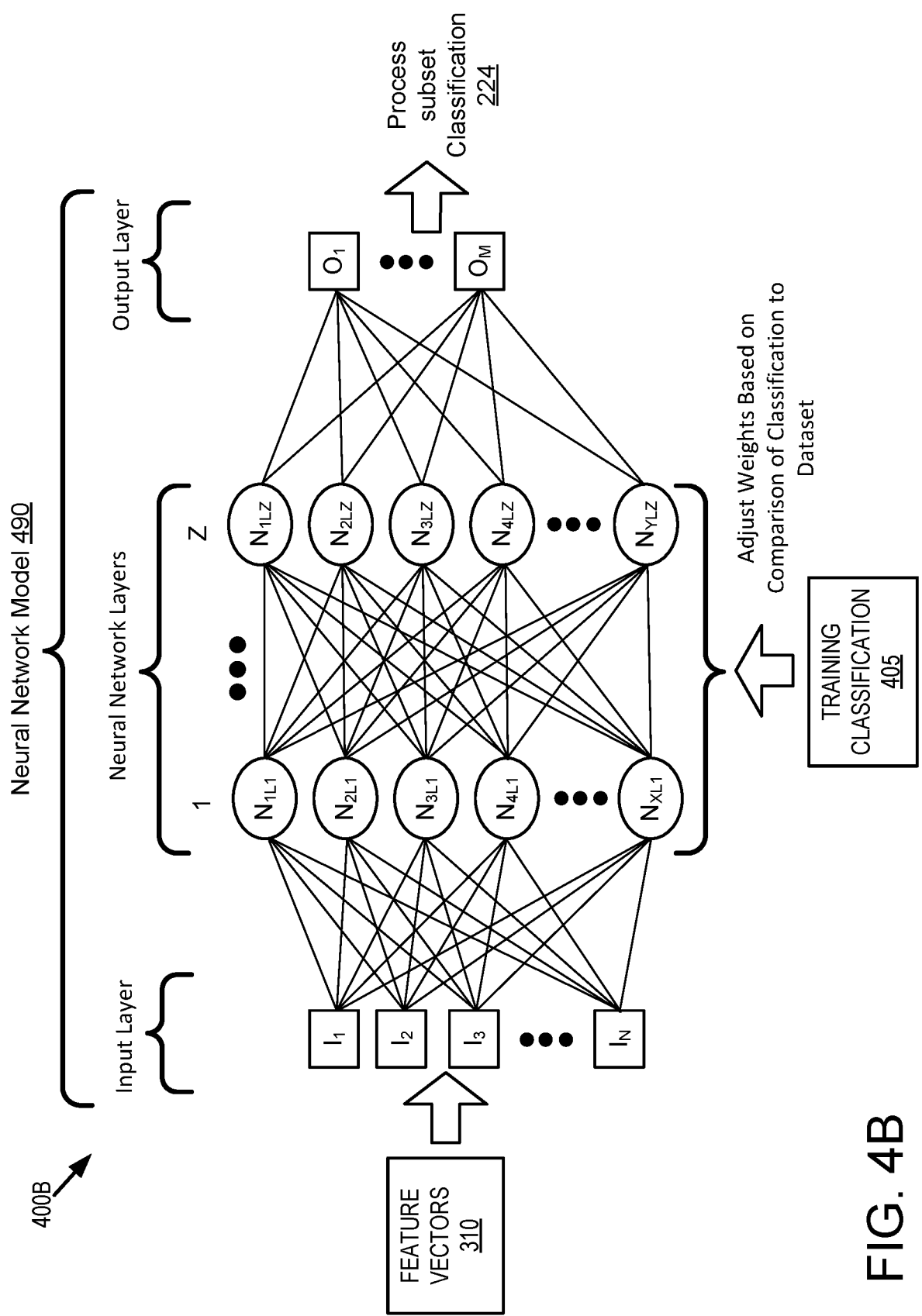
FIG. 4B is a block diagram of a system incorporating a neural network model for generating a classification of a process subset based on a set of feature vectors, according to some embodiments of the present disclosure.

FIGS. 4A and 4B are block diagrams illustrating training systems 400 for performing a machine learning operation based on feature vectors 310 from process subset data 250, according to some embodiments of the present disclosure.

Referring to FIG. 4A, a system 400A for performing a machine learning operation may include learning operations 430 which perform a feedback controlled comparison between a training dataset 420 and a testing dataset 425 based on the feature vectors 310.

For example, the feature vectors 310, generated from the process subset store 285 as described herein, may be combined with training classification data 405 to generate process-specific input data 407. More specifically feature vectors 310 from a particular process subset 250 of a process 210 may be combined with training classification data 405 for the same process subset 250, where the training classification data 405 for the process subset 250 identifies whether the process subset 250 contains or is associated with malware. In some embodiments, as part of training an ML model 265, particular process subsets 250 from a process subset store 285 with known classifications (e.g., it is known whether the process subset 250 contains or is associated with malware) may be collected and feature vectors 310 may be formed from each of the process subsets 250 from the process subset store 285 with known classifications. The known classification of a given process subset 250 may be used as the training classification value 405 and combined with the feature vectors 310 to form the process-specific input data 407 for that process subset 250.

For example, process subset data 250 may be collected from a process 210 that is generated from a process executable 110 that is known to contain or be associated with malware. Thus, a training classification value 405 of the known-bad process subset 250 may be generated indicating that the process subset 250 is associated with malware. A set of feature vectors 310 may be generated from the process subset 250 (as described herein with respect to FIG. 3). The set of feature vectors 310 may be combined with the training classification value 405 (e.g., malware) to generate the process-specific input data 407 for that process subset 250.

Similarly, process subset data 250 may be collected from a process 210 that is generated from a process executable 110 that is known to be free of malware. Thus, a training classification value 405 of the known-good process subset 250 may be generated indicating that the process subset 250 is free of malware. A set of feature vectors 310 may be generated from the process subset 250. The set of feature vectors 310 may be combined with a training classification value 405 (e.g., malware-free) to generate the process-specific input data 407 for that process subset 250.

In this way, process-specific input data 407 may be generated for each process subset 250 of a process subset store 285 used for training the ML model 265. The process specific input data 407 may be separated into two groups: a training dataset 420 and a testing dataset 425. Each group of the training dataset 420 and the testing dataset 425 may include process-specific input data 407 (e.g., feature vectors 310 and their associated training classification value 405) for a plurality of process subsets 250.

Learning operation 430 may be performed on the training dataset 420. The learning operations 430 may examine the feature vectors 310 to establish a relationship between the elements of the feature vectors 310 that accurately predict the classification value 405 (e.g., malware or not malware) for a given process subset 250. The learning operations 430 may generate a ML training model 465 that represents the determined relationship. The ML training model 465 may take a feature vector 310 as input, and output a classification value 405 (e.g., malware or non-malware) for the process subset 250 associated with the feature vector 310. The learning operations 430 may attempt to adjust parameters 435 of the ML training model 465 to generate a best-fit algorithm that describes a relationship between the feature vectors 310 and the classification value 405 for all of the process subsets 250 of the training dataset 420. A set of parameters 435 may be selected based on the training dataset 420 and preliminarily established as the ML training model 465.

The results of the learning operations 430 may be provided to an evaluation operation 440. The evaluation operation 440 may utilize the ML training model 465 generated by the learning operations 430 (based on the training dataset 420) to see if the ML training model 465 correctly predicts the training classification value 405 for the feature vectors 310 for the process subsets 250 of the testing dataset 425. If the ML training model 465 accurately predicts the classification values 405 of the testing dataset 425, it may be promoted to the ML model 265. If the ML training model 465 does not accurately predict the classification value 405 of the testing dataset 425, feedback 412 may be provided to the learning operations 430, and the learning operations 430 may be repeated, with additional adjustment of the parameters 435. This process of learning operations 430 and evaluation operation 440 may be repeated until an acceptable ML model 265 is generated.

Once the ML model 265 is generated, it may be used to predict classifications 224 for production feature vectors 310. For example, for a given process 210, a process subset 250 may be generated, as described herein with respect to FIG. 1 A set of feature vectors 310 may be generated in a manner similar to that discussed herein with respect to FIG. 3. For example, the process subset 250 may be scanned for byte n-gram within the process subset 250 utilizing an embedding machine learning model, a presence of a defined string value within the process subset 250, characteristics of the headers within the process subset 250, or a calculated entropy of a portion of the process subset 250.

As illustrated in FIG. 4A, the feature vector 310 may be provided to the ML model 265. The operations of the ML model 265 may generate the classification 224 (e.g., whether or not the process subset 250 associated with the production feature vector 310 contains and/or is associated with malware).

The training system 400A may use a number of different types of machine learning algorithms. For example, in some embodiments, the training system 400A may use a cross-validation-based machine learning platform. In some embodiments, the training system 400A utilizes a k-folds cross-validation, though the embodiments of the present disclosure are not limited thereto. It will be understood that other types of cross-validation, as well as other types of machine learning, may be used without deviating from the embodiments of the present disclosure.

For example, FIG. 4B is a block diagram of a system 400B incorporating a neural network model 490 for generating a classification 224 of a process subset 250 based on a set of feature vectors 310, according to some embodiments of the present disclosure.

Referring to FIG. 4B, the neural network model 490 includes an input layer having a plurality of input nodes $I_1$ to $I_N$, a sequence of neural network layers (layers 1 to Z are illustrated in FIG. 4B) each including a plurality (e.g., 1 to X in FIG. 4B) of weight nodes, and an output layer including at least one output node. In the particular non-limiting example of FIG. 4B, the input layer includes input nodes $I_1$ to $I_N$ (where N is any plural integer). A first one of the sequence of neural network layers includes weight nodes $N_{1L1}$ (where "1L1" refers to a first weight node on layer one) to $N_{XL1}$ (where X is any plural integer). A last one ("Z") of the sequence of neural network layers includes weight nodes $N_{1LZ}$ (where Z is any plural integer) to $N_{YLZ}$ (where Y is any plural integer). The output layer includes a plurality of output nodes O1 to $O_M$ (where M is any plural integer).

The neural network model 490 can be operated to process elements of the feature vectors 310 through different inputs (e.g., input nodes $I_1$ to $I_N$) to generate one or more outputs (e.g., output nodes O1 to $O_M$). The elements of the feature vectors 310 that can be simultaneously processed through different input nodes $I_1$ to $I_N$ may include, for example, statistical values (e.g., minimum, maximum, average, and/or standard deviation) of axes of an embedding space based on processing byte n-grams within the process subset 250 by an embedding machine learning model, counts of a presence of a defined string value within the process subset 250, data associated with characteristics of sections and/or headers within the process subset 250, or a calculated entropy of a portion of the process subset 250, as discussed herein. The process classification 224 that can be output (e.g., through output nodes O1 to $O_M$) may include an indication of whether the process subset 250 associated with the feature vector 310 is and/or is associated with malware.

During operation and/or training of the neural network model 490, the various weights of the neural network layers may be adjusted based on a comparison of predicted process classification 224 to data of an actual classification (such as training classification value 405). The comparison may be performed, for example, through the use of a loss function. The loss function may provide a mechanism to calculate how poorly the training model is performing by comparing what the model is predicting with the actual value it is supposed to output. The interconnected structure between the input nodes, the weight nodes of the neural network layers, and the output nodes may cause a given element of the feature vector 310 to influence the classification prediction 224 generated for all of the other elements of the feature vector 310 that are simultaneously processed. The classification prediction 224 generated by the neural network model 490 may thereby identify a comparative prioritization of which of the elements of the feature vector 310 provide a higher/lower impact on the classification 224 as to whether the associated process subset 250 is, or is not, associated with malware.

The neural network model 490 of FIG. 4B is an example that has been provided for ease of illustration and explanation of one embodiment. Other embodiments may include any non-zero number of input layers having any non-zero number of input nodes, any non-zero number of neural network layers having a plural number of weight nodes, and any non-zero number of output layers having any non-zero number of output nodes. The number of input nodes can be selected based on the number of input values that are to be simultaneously processed, and the number of output nodes can be similarly selected based on the number of output characteristics that are to be simultaneously generated therefrom.

The systems 400A, 400B of FIGS. 4A and 4B provide an improvement in the technology associated with computer security. For example, the systems 400A, 400B provide an improved malware detection platform that is able to adapt to changes in malware that may be detected from a malware that is dynamically inserted in a running process 210. The systems 400A, 400B are an improvement over some techniques for malware detection in that they do not exclusively utilize static signatures, which may be quickly varied by malware developers. Instead, embodiments according to the present disclosure may identify malware based on characteristics of portions of the running process associated with the malware, and may be able to bypass obfuscation techniques that might otherwise make the malware detection difficult.

Figure 5A:
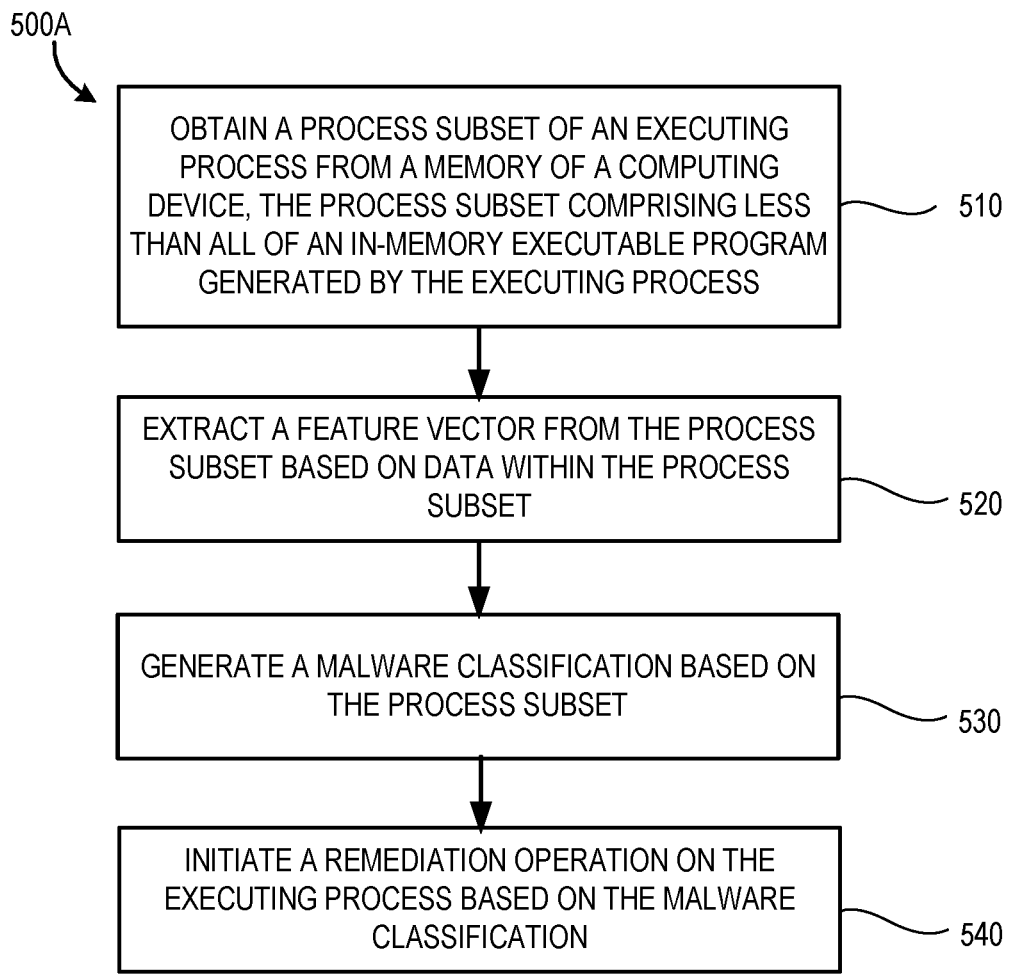
FIG. 5A is a flow diagram of a method for operating a malware detection system, according to some embodiments of the present disclosure.

FIG. 5A is a flow diagram of a method 500A for operating a malware detection system, in accordance with some embodiments of the present disclosure. Method 500A may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500A may be performed by a computing device (e.g., detection computing device 110 and/or client computing device 120).

With reference to FIG. 5A, method 500A illustrates example functions used by various embodiments. Although specific function blocks ("blocks") are disclosed in method 500A, such blocks are examples. That is, embodiments are well suited to performing various other blocks or variations of the blocks recited in method 500A. It is appreciated that the blocks in method 500A may be performed in an order different than presented, and that not all of the blocks in method 500A may be performed.

Referring simultaneously to the prior figures as well, the method 500A begins at block 510, in which a process subset of an executing process from a memory of a computing device is obtained. The process subset may include less than all of an in-memory executable program generated by the executing process. The process subset and process may be similar to the process subset 250 and/or the process 210 described herein with respect to FIGS. 1 to 4B. The in-memory executable program may be similar to the in-memory executable program 230 described herein with respect to FIGS. 1 to 4B. In some embodiments, the in-memory executable program comprises a .NET assembly. In some embodiments, the process subset comprises a start of the in-memory executable program.

At block 520, a feature vector may be extracted from the process subset based on data within the process subset. The feature vector may be similar to the feature vector 310 described herein with respect to FIGS. 1 to 4B. In some embodiments, the feature vectors may include one or more of: statistical characteristics based on byte n-grams within the process subset, a presence of a defined string value within the process subset, characteristics of headers contained within the process subset, or a calculated entropy of a portion of the process subset. Extracting the feature vector may be performed similarly to those operations described herein with respect to FIG. 3. In some embodiments, the statistical characteristics based on byte n-grams within the process subset may include a minimum value, a maximum value, an average value, and/or a standard deviation associated with axes of an embedding space generated by an embedding machine learning model from processing the byte n-grams of the process subset.

At block 530, a malware classification may be generated based on the process subset. The malware classification may be similar to the malware classification 224 described herein with respect to FIGS. 1 to 4B. In some embodiments, the malware classification may be a probability that the process subset is, or is associated with, malware.

At block 540, a remediation operation may be initiated on the process based on the malware classification. In some embodiments, the remediation operation comprises one or more of terminating the executing process, terminating the in-memory executable program, preventing the in-memory executable program from accessing resources of the computing device, and/or generating an alert regarding the executing process.

In some embodiments, the computing device is a first computing device, and generating the malware classification based on the process subset is performed by a second computing device, different from the first computing device. In some embodiments, initiating the remediation operation comprises transmitting the malware classification from the second computing device to the first computing device.

Figure 5B:
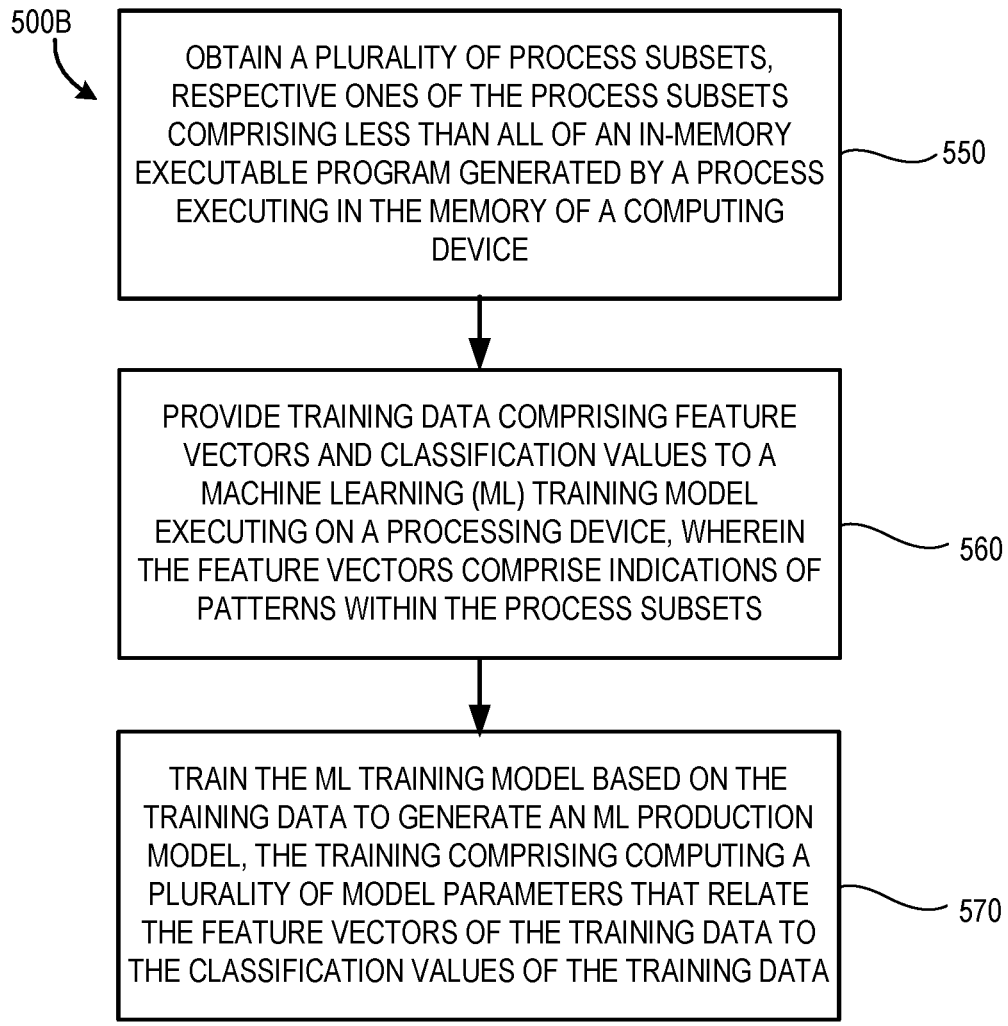
FIG. 5B is a flow diagram of a method for operating a malware detection system, according to some embodiments of the present disclosure.

FIG. 5B is a flow diagram of a method 500B for operating a malware detection system, in accordance with some embodiments of the present disclosure. Method 500B may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500B may be performed by a computing device (e.g., detection computing device 110 and/or client computing device 120).

With reference to FIG. 5B, method 500B illustrates example functions used by various embodiments. Although specific function blocks ("blocks") are disclosed in method 500B, such blocks are examples. That is, embodiments are well suited to performing various other blocks or variations of the blocks recited in method 500B. It is appreciated that the blocks in method 500B may be performed in an order different than presented, and that not all of the blocks in method 500B may be performed.

Referring simultaneously to the prior figures as well, the method 500B begins at block 550, in which a plurality of process subsets are obtained. Respective ones of the process subsets may include less than all of an in-memory executable program generated by a process executing in the memory of a computing device. The process subset and process may be similar to the process subset 250 and/or the process 210 described herein with respect to FIGS. 1 to 4B. The in-memory executable program may be similar to the in-memory executable program 230 described herein with respect to FIGS. 1 to 4B. In some embodiments, the in-memory executable program comprises a .NET assembly. In some embodiments, the process subset comprises a start of the in-memory executable program.

At block 560, training data including feature vectors and classification values may be provided to an ML training model executing on a processing device. The feature vectors may include indications of patterns within the process subsets. In some embodiments, the training data and classification values may be similar to training data 407 and classification values 405 described herein with respect to FIGS. 4A and 4B. In some embodiments, the ML training model may be similar to the ML training model 465, 490 described herein with respect to FIGS. 4A and 4B. In some embodiments, the feature vectors may be similar to feature vectors 310 described herein with respect to FIGS. 1 to 4B. In some embodiments, the feature vectors may include one or more of: statistical characteristics based on byte n-grams within the process subset, a presence of a defined string value within the process subset, characteristics of headers contained within the process subset, or a calculated entropy of a portion of the process subset. Extracting the feature vector may be performed similarly to those operations described herein with respect to FIG. 3. In some embodiments, the statistical characteristics based on byte n-grams within the process subset may include a minimum value, a maximum value, an average value, and/or a standard deviation associated with axes of an embedding space generated by an embedding machine learning model from processing the byte n-grams of the process subset.

At block 570, ML training model may be trained based on the training data to generate an ML production model. The training may include computing a plurality of model parameters that relate the feature vectors of the training data to the classification values of the training data. In some embodiments, the ML production model may be similar the ML model 265 described herein with respect to FIGS. 1 to 4B. In some embodiments, training the ML training model includes validating the training data with respect to the classification values using cross-validation.

In some embodiments, the training further includes determining whether the classification values of the training data match an output of the ML training model. In some embodiments, in response to determining that the classification values of the training data do not match the output of the ML training model, the method 500B further includes adjusting one or more of the plurality of model parameters and repeating the training of the ML training model based on the training data.

In some embodiments, the method 500B further includes providing a process subset to the ML production model to generate a malware classification for a process associated with the process subset.

Figure 6:
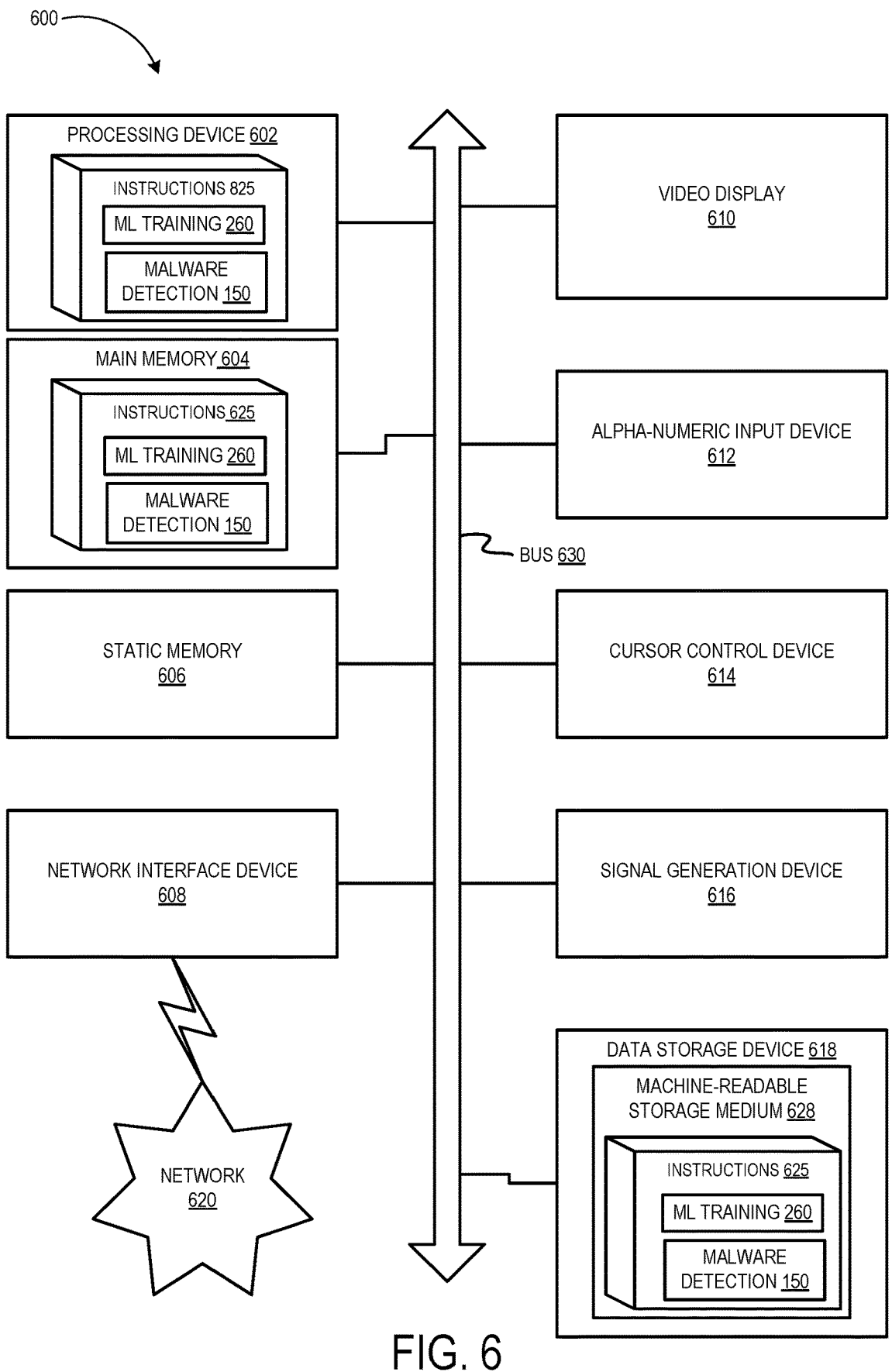
FIG. 6 is a block diagram of an example computing device that may perform one or more of the operations described herein, in accordance with embodiments of the disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory) and a data storage device 618, which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a malware detection engine 150 and/or an ML training engine 260 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "obtaining," "extracting," "generating," "initiating," "transmitting," "providing," "training," "determining," "validating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A computer implemented method for detecting malware, the method comprising:
    detecting that an executable program is loaded into a process that is executing in a memory of a computing device via reflective loading that bypasses a file system of the computing device, wherein the process executes the in-memory executable program;
    in response to detecting that the executable program is loaded into the memory, obtaining a process subset of the executing process from the memory, wherein the process subset comprises code from a portion of the in-memory executable program currently loaded in the memory, the code comprising at least a start of the in-memory executable program;
    extracting a feature vector from the process subset based on data within the process subset;
    generating, by a processing device executing an ML model, a malware classification based on the process subset; and
    initiating a remediation operation on the executing process based on the malware classification.

2. The computer implemented method of claim 1, wherein the feature vector comprises one or more of: statistical characteristics based on byte n-grams within the process subset, a presence of a defined string value within the process subset, characteristics of headers contained within the process subset, or a calculated entropy of the portion of the process subset.

3. The computer implemented method of claim 1, wherein the in-memory executable program comprises a .NET assembly.

4. The computer implemented method of claim 1, wherein the computing device is a first computing device, and
    wherein generating the malware classification based on the process subset is performed by a second computing device, different from the first computing device.

5. The computer implemented method of claim 4, wherein initiating the remediation operation comprises transmitting the malware classification from the second computing device to the first computing device.

6. The computer implemented method of claim 1, wherein the remediation operation comprises one or more of terminating the executing process, terminating the in-memory executable program, preventing the in-memory executable program from accessing resources of the computing device, or generating an alert regarding the executing process.

7. A system comprising:
    a memory; and
    a processing device, operatively coupled to the memory, to:
        detect that an executable program is loaded into a process that is executing in the memory via reflective loading that bypasses a file system, wherein the process executes the in-memory executable program;
        responsive to detecting that the executable program is loaded into the memory, obtain a process subset of the executing process from the memory, wherein the process subset comprises code from a portion of the in-memory executable program currently loaded in the memory, the code comprising at least a start of the in-memory executable program;
        extract a feature vector from the process subset based on data within the process subset;
        generate, by an ML model, a malware classification based on the process subset; and
        initiate a remediation operation on the executing process based on the malware classification.

8. The system of claim 7, wherein the feature vector comprises one or more of: statistical characteristics based on byte n-grams within the process subset, a presence of a defined string value within the process subset, characteristics of headers contained within the process subset, or a calculated entropy of the portion of the process subset.

9. The system of claim 7, wherein the in-memory executable program comprises a .NET assembly.

10. The system of claim 7, wherein the system is a first computing device, and
    wherein generating the malware classification based on the process subset is performed by a second computing device, different from the first computing device.

11. The system of claim 10, wherein, to initiate the remediation operation, the processing device is to transmit the malware classification from the second computing device to the first computing device.

12. The system of claim 7, wherein the remediation operation comprises one or more of terminating the executing process, terminating the in-memory executable program, preventing the in-memory executable program from accessing resources of the system, or generating an alert regarding the executing process.

13. A non-transitory computer-readable storage medium including instructions that, when executed by a processing device, cause the processing device to:
    detect that an executable program is loaded into a process that is executing in a memory of a computing device via reflective loading that bypasses a file system of the computing device, wherein the process executes the in-memory executable program;
    responsive to detecting that the executable program is loaded into the memory, obtain a process subset of the executing process from the memory, wherein the process subset comprises code from a portion of the in-memory executable program currently loaded in the memory, the code comprising at least a start of the in-memory executable program;
    extract a feature vector from the process subset based on data within the process subset;
    generate, by an ML model, a malware classification based on the process subset; and
    initiate a remediation operation on the executing process based on the malware classification.

14. The non-transitory computer-readable storage medium of claim 13, wherein the feature vector comprises one or more of: statistical characteristics based on byte n-grams within the process subset, a presence of a defined string value within the process subset, characteristics of headers contained within the process subset, or a calculated entropy of the portion of the process subset.

15. The non-transitory computer-readable storage medium of claim 13, wherein the in-memory executable program comprises a .NET assembly.

16. The non-transitory computer-readable storage medium of claim 13, wherein the computing device is a first computing device, and
    wherein generating the malware classification based on the process subset is performed by a second computing device, different from the first computing device.

17. The non-transitory computer-readable storage medium of claim 13, wherein the remediation operation comprises one or more of terminating the executing process, terminating the in-memory executable program, preventing the in-memory executable program from accessing resources of the computing device, or generating an alert regarding the executing process.

* * * * *